(12) United States Patent
Van Den Berg et al.

(10) Patent No.: US 8,703,094 B2
(45) Date of Patent: Apr. 22, 2014

(54) PROCESS TO PREPARE A HYDROGEN RICH GAS MIXTURE

(75) Inventors: Robert Van Den Berg, Amsterdam (NL); Matthieu Simon Henri Fleys, Amsterdam (NL); Frank Haiko Geuzebroek, Amsterdam (NL); Mark Jan Prins, Amsterdam (NL)

(73) Assignee: Shell Oil Company, Houston, TX (US)

( * ) Notice: Subject to any disclaimer, the term of this patent is extended or adjusted under 35 U.S.C. 154(b) by 94 days.

(21) Appl. No.: 13/377,891

(22) PCT Filed: Jun. 28, 2010

(86) PCT No.: PCT/EP2010/059111
§ 371 (c)(1),
(2), (4) Date: Feb. 9, 2012

(87) PCT Pub. No.: WO2011/000792
PCT Pub. Date: Jan. 6, 2011

(65) Prior Publication Data
US 2012/0128579 A1 May 24, 2012

(30) Foreign Application Priority Data

Jun. 30, 2009 (EP) .................... 09164114

(51) Int. Cl.
*C01B 3/12* (2006.01)
*C01B 3/32* (2006.01)

(52) U.S. Cl.
CPC .................................. *C01B 3/32* (2013.01)
USPC ........................................................ 423/655

(58) Field of Classification Search
USPC ........................................................ 423/655
See application file for complete search history.

(56) References Cited

U.S. PATENT DOCUMENTS

| | | | |
|---|---|---|---|
| 4,510,874 A | 4/1985 | Hasenack | 110/347 |
| 4,523,529 A | 6/1985 | Poll | 110/263 |
| 4,887,962 A | 12/1989 | Hasenack et al. | 110/263 |
| 4,981,661 A | 1/1991 | Borsboom et al. | 423/244 |
| 5,512,260 A | 4/1996 | Kiliany et al. | 423/242.1 |
| 2005/0135983 A1 | 6/2005 | Geosits et al. | |
| 2006/0233687 A1 | 10/2006 | Hojlund Nielsen | 423/210 |
| 2007/0072949 A1 | 3/2007 | Ruud et al. | |
| 2009/0118119 A1* | 5/2009 | Ratnasamy et al. | 502/303 |

FOREIGN PATENT DOCUMENTS

| | | | |
|---|---|---|---|
| DE | 1149486 | 8/1959 | C10K 3/04 |
| EP | 0066310 A1 | 12/1982 | |
| EP | 0550242 | 7/1993 | C01B 3/48 |
| EP | 0551951 | 7/1993 | B01D 46/24 |
| EP | 0934904 A2 | 8/1999 | |
| EP | 1195353 A1 | 4/2002 | |
| EP | 1499418 | 10/2003 | B01D 46/24 |
| EP | 1939138 | 7/2008 | C01B 3/52 |
| WO | 03080221 A | 10/2003 | |
| WO | WO2006070018 | 7/2006 | C10K 3/04 |
| WO | 2009019497 A1 | 2/2008 | |
| WO | 2008124767 A2 | 10/2008 | |

OTHER PUBLICATIONS

Chiesa , P. et al; "Co-production of hydrogen, electricity and $CO_2$ from coal with commercially ready technology. Part A: Performance and emissions"; International Journal of Hydrogen Energy; vol. 30, No. 7; pp. 747-767; Nov. 5, 2004.
US Environmental Protection Agency; "SITE Technology Capsule-Texaco Gasification Process"; Office of Research and Development, Cincinnati, OH; Internet website, www.epa.gov/nrmrl/lrpcd/site/reports/540r94514/640r945154a.pdf; Apr. 1, 1995; 12 pages.
Xue, E., et al.; "Water-gas shift conversion using a feed with low steam to carbon monoxide ratio and containing sulphur"; Catalysis Today; vol. 30; pp. 107-118; Jan. 1, 1996.

* cited by examiner

*Primary Examiner* — Melvin C Mayes
*Assistant Examiner* — Kenneth Vaden

(57) ABSTRACT

The invention is directed to a process to prepare a hydrogen rich gas mixture from a solid sulphur- and halogen-containing carbonaceous feedstock. The process involves the following steps. Step (a): gasification of the solid carbonaceous feedstock with an oxygen-containing gas to obtain a gas mixture comprising halogen compounds, sulphur compounds, hydrogen and at least 50 vol. % carbon monoxide, on a dry basis. Step (b): contacting the gas mixture with a quench gas or quench liquid to reduce the temperature of the gas mixture to below 900° C. Step (c) contacting the gas mixture with water having a temperature of between 150 and 250° C. to obtain a gas mixture comprising between 50 and 1000 ppm halogen and having a steam to carbon monoxide molar ratio of between 0.2:1 and 0.9:1. Step (d): subjecting the gas mixture obtained in step (c) to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C. Step (e): carbon dioxide and sulphur compounds are separated from the shifted gas mixture obtained in step (d) by contacting the shifted gas mixture with a solvent comprising dialkyl ethers of polyethylene glycol.

12 Claims, No Drawings

PROCESS TO PREPARE A HYDROGEN RICH GAS MIXTURE

The present application claims priority from PCT/EP2010/059111, filed 28 Jun. 2010, which claims priority from European Application 09164114.2, filed 30 Jun. 2009

The invention is directed to a process to prepare a hydrogen rich gas mixture from a solid sulphur- and halogen-containing carbonaceous feedstock.

Patent publication WO-A-2006/070018 describes a process wherein a synthesis gas having a hydrogen/carbon monoxide ($H_2$/CO) molar ratio of below 1 is obtained by partial oxidation of a solid carbonaceous feed, such as coal. The hydrogen/carbon monoxide ($H_2$/CO) molar ratio is increased by dividing the synthesis gas into at least two sub-streams, wherein one sub-stream undergoes a catalytic water shift conversion reaction, and wherein the so-obtained converted sub-stream is combined with the non-converted sub-stream to form a synthesis gas having an increased $H_2$/CO ratio of between 1.4 and 1.95.

A disadvantage of the above process is that significant amounts of steam have to be added to the feed of the water shift conversion reaction. This steam has to be prepared in for example dedicated boilers, which adds complexity to the process.

EP-A-1939138 describes a process wherein certain of the disadvantages of the aforementioned process are mitigated. In this process the gas is first subjected to a water-scrubbing step to remove the halogen compounds from the gas. Subsequently part of the scrubbed gas is contacted with liquid water having a temperature of below the saturation temperature of water. After adding additional steam the gas is used as feed to the water gas shift reaction. The molar ratio of steam to carbon monoxide in said feed is preferably about 2.8:1 according to this publication.

A disadvantage of this process is that a complex process line-up is required to increase the steam content in the gas as fed to the water gas shift reaction step. There is a desire for a more efficient process. The following process provides such a more efficient process.

Process to prepare a hydrogen rich gas mixture from a solid sulphur- and halogen-containing carbonaceous feedstock by
(a) gasification of the solid carbonaceous feedstock in an entrained flow gasifier provided with one or more burners, wherein the carbonaceous feedstock is provided to said burner(s) as a mixture of the solid carbonaceous feedstock and a gaseous carrier gas with an oxygen-containing gas to obtain a gas mixture comprising halogen compounds, sulphur compounds, hydrogen and at least 50 vol. % carbon monoxide, on a dry basis,
(b) contacting the gas mixture with a quench gas or quench liquid to reduce the temperature of the gas mixture to below 900° C.,
(c) contacting the gas mixture obtained in step (b) with water in a counter-current contactor having a top end and a bottom end, wherein water having a temperature of between 150 and 250° C. is continuously fed to the top of the contactor and the gas mixture to the bottom end to obtain a gas mixture comprising between 50 and 1000 ppm halogen and having a steam to carbon monoxide molar ratio of between 0.2:1 and 0.9:1,
(d) subjecting the gas mixture obtained in step (c) to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C. and wherein (e) carbon dioxide and sulphur compounds are separated from the shifted gas mixture obtained in step (d) by contacting the shifted gas mixture with a solvent comprising dialkylethers of polyethylene glycol.

It has been found that with the above process, hydrogen can be prepared from solid sulphur- and halogen-containing carbonaceous feedstock wherein less added steam is required and wherein the process line-up is simplified as compared to the prior art process.

In step (a) the solid carbonaceous feedstock is subjected to gasification with an oxygen-containing gas to obtain a gas mixture comprising halogen compounds, sulphur compounds, hydrogen and at least 50 vol. % carbon monoxide, on a dry basis. To obtain such a high CO content gas mixture step (a) is preferably performed (i) in a so-called entrained flow gasifier provided with one or more burners, (ii) wherein the carbonaceous feedstock is provided to said burner(s) as a mixture of the solid carbonaceous feedstock and a gaseous carrier gas and (iii) wherein the gas mixture as obtained in said gasifier is reduced in temperature by means of an indirect heat exchanger to a temperature of between 150 and 400° C. The high content CO mixture thus obtained is preferably not saturated with water.

The gasification in the entrained flow gasifier suitably takes place at a temperature of between 1200 and 1800° C. preferably between 1400 and 1800° C. at a pressure of between 2 and 10 MPa. The solid carbonaceous feed is partially oxidised with an oxygen-comprising gas. Preferred carbonaceous feeds are solid, high carbon containing feedstocks, more preferably it is substantially (i.e. >90 wt. %) comprised of naturally occurring coal or synthetic (petroleum) cokes, most preferably coal. Suitable coals include lignite, bituminous coal, sub-bituminous coal, anthracite coal, and brown coal. Another suitable feedstock is biomass. The ash content in the feedstock is suitably between 0.5 and 40 wt %.

The gasification is preferably carried out in the presence of oxygen and optionally some steam, the purity of the oxygen preferably being at least 90% by volume, nitrogen, carbon dioxide and argon being permissible as impurities. Substantially pure oxygen is preferred, such as prepared by an air separation unit (ASU). Oxygen may contain some steam. Steam acts as moderator gas in the gasification reaction. The ratio between oxygen and steam is preferably from 0 to 0.3 parts by volume of steam per part by volume of oxygen. The oxygen used is preferably heated before being contacted with the coal, preferably to a temperature of from about 200 to 500° C.

If the water content of the carbonaceous feed, as can be the case when for example lignite is used as feedstock, is too high, the feedstock is preferably dried before use.

The solid carbonaceous feedstock is preferably supplied to the burner of the gasifier in the form of a powder and a carrier gas. Suitable carrier gasses are for example nitrogen, carbon dioxide or recycle synthesis gas. The burner or burners fire into a gasification chamber as present in a gasifier. Examples of suitable burners are described in U.S. Pat. No. 4,887,962, U.S. Pat. No. 4,523,529 and U.S. Pat. No. 4,510,874. The gasses, having the elevated temperature at which the gasification takes place, are reduced in temperature to a temperature of between 150 and 400° C., wherein at least one of the temperature reducing steps is by means of an indirect heat exchanger. Other temperature reducing means may be to contact the gas with a quench gas or quench liquid to first reduce the temperature to below 900° C. and subsequently reduce the temperature by means of an indirect heat exchanger to a temperature of between 150 and 400° C. Suitable quench gasses are nitrogen, product gasses, suitably obtained after step (c), which are recycled, and steam. Suitable quench liquid is water. Preferably, the manner of contacting with steam and/or water be such that the gas is not saturated with water at the final reduced temperature levels described above.

If ash compounds are present in the thus cooled gas mixture it is preferred to remove these particles, sometimes referred to as flyash, from the gas before performing step (d). Preferably this gas mixture is not saturated with water. Ash is preferably separated from such a non-water saturated gas by means of a cyclone or by means of a ceramic filter or a metal filter as for example described in EP-A-551951 and EP-A-1499418.

Typical halogen compounds as present in the cooled gas mixture are chloride compounds, like for example HCl, and optionally fluoride compounds, like for example HF. The halogen content in said gas mixture is suitably between 50 and 1000 ppm. Said gas mixture is referred to herein as a gas mixture poor in halogen.

Contacting the gas mixture obtained in step (b) with water in step (c) is preferably performed in a counter-current contactor having a top end and a bottom end, wherein water having a temperature of between 150 and 250° C. is continuously fed to the top of the contactor and the gas mixture to the bottom end. In such a contactor the gas mixture poor in halogen and having a steam to carbon monoxide molar ratio of between 0.2:1 and 0.9:1 is continuously obtained at the top of the contactor and a halogen laden water stream is obtained at the bottom. Part of this water may be recycled to the top and part is preferably treated. Some water will evaporate and will end up in the gas mixture poor in halogen as steam. The gas will typically be saturated with steam at the conditions of the gas as it exits the top of the contactor. It is with the capabilities of the skilled person to choose the temperature of the halogen-containing gas mixture, the temperature of the water as fed to the top of the contactor from the above ranges and the throughput to achieve a steam to carbon monoxide molar ratio of between 0.2:1 and 0.9:1 in the gas mixture poor in halogen.

An advantage of the present process is that the steam content of the gas mixture poor in halogen as it leaves the contactor is in the correct range to perform the water gas shift reaction. The invention is thus also directed to a process wherein no water or steam is added to the gas mixture poor in halogen before performing the water gas shift reaction in the reactor or, in case of more than one reactor, in the first reactor of such a series of reactors. More preferably the gas mixture poor in halogen as obtained after contacting with water is directly used as feed to the water gas shift reaction. In case a series of water gas shift reactions take place the gas mixture poor in halogen is directly used as feed to the first water gas shift reaction in such a preferred embodiment.

In the next step (d) the gas mixture poor in halogen is subjected to a water gas shift reaction wherein part or all of the carbon monoxide is converted with the steam to hydrogen and carbon dioxide in the presence of a catalyst according to the following reaction:

$$CO+H_2O \rightarrow CO_2+H_2$$

The water gas shift is performed by a process wherein carbon monoxide as present in a gas mixture is converted with a low amount of steam to a mixture of hydrogen and carbon dioxide by means of a catalyzed water gas shift reaction as performed in the presence of a catalyst as present in one or more fixed bed reactors. A series of water gas shift reactors may be used wherein in each reactor a water gas shift conversion step is performed. The content of carbon monoxide, on a dry basis, in the syngas mixture as supplied to the first water gas shift conversion step or reactor is preferably at least 50 vol. %, more preferably between 50 and 75 vol. %. The syngas preferably contains hydrogen sulphide in order to keep the catalyst sulphided and active. The minimum content of hydrogen sulphide will depend on the operating temperature of the reactor, on the space velocity (GHSV) and on the sulphur species present in the syngas mixture. Preferably at least 300 ppm $H_2S$ is present in the syngas mixture. There is no limitation on the maximum amount of $H_2S$ from a catalyst activity point of view.

The steam to carbon monoxide molar ratio in the syngas as it enters the first reactor is between 0.2:1 and 0.9:1. The temperature of the syngas as it enters the reactor is preferably between 190 and 230° C. In addition it is preferred that the inlet temperature is between 10 and 60° C. above the dew-point of the feed to each water gas shift conversion step. The space velocity in the reactor is preferably between 6000-9000 $h^{-1}$. The pressure will depend on the pressure at which the above described gasification is performed and is preferably between 2 and 5 MPa and more preferably between 3 and 4.5 MPa.

The conversion of carbon monoxide will not be 100% because of the sub-stoichiometric amount of steam present in the feed of the reactor. In a preferred embodiment the content of carbon monoxide in the reactor effluent of a first fixed bed reactor, on a dry basis, will be between 35 and 50 vol. % when starting from a syngas mixture comprising between 55 and 70 vol. % carbon monoxide, on a dry basis, and a steam/CO ratio of 0.2 to 0.3 molar. If a further conversion of carbon monoxide is desired it is preferred to subject the effluent to a next water gas shift conversion step as performed in a next fixed bed reactor. The steam to carbon monoxide molar ratio, inlet temperature and space velocity for such subsequent water gas shift conversion steps may be as described for the first water gas shift conversion step.

In order to achieve the desired steam to CO molar ranges for the subsequent steps, after performing a first water gas shift reaction in a first reactor, steam or boiler feed water may be added to the effluent of each previous step. Preferably boiler feed water is added to the relatively hot effluent of the previous reactor in order to reduce the temperature to the desired ranges and at the same time generate steam.

The water gas shift step may be repeated to stepwise lower the carbon monoxide content in the effluent of each next water gas shift reactor to a CO content, on a dry basis, of below 5 vol. %, preferably below 1 vol. %. It has been found that in 4 to 5 steps, or said otherwise, in 4 to 5 reactors such a CO conversion can be achieved.

It has been found that it is important to control the temperature rise in each reactor. It is preferred to operate each reactor such that the maximum temperature in the catalyst bed in a single reactor does not exceed 440° C. and more preferably does not exceed 400° C. At higher temperatures the exothermal methanation reaction can take place, resulting in an uncontrolled temperature rise.

The catalyst is preferably a water gas shift catalyst, which is active at the preferred low steam to CO molar ratio and active at the relatively low inlet temperature without favouring side reactions such as methanation. Suitably the catalyst comprises a carrier and the oxides or sulphides of molybdenum (Mo), more preferably a mixture of the oxides or sulphides of molybdenum (Mo) and cobalt (Co) and even more preferably also comprising copper (Cu) tungsten (W) and/or nickel (Ni). The catalyst suitably also comprises one or more promoters/inhibitors such as potassium (K), lanthanum (La), manganese (Mn), cerium (Ce) and/or zirconium (Zr).

The carrier may be a refractory material such as for example alumina, $MgAl_2O_4$ or $MgO—Al_2O_3—TiO_2$.

An example of a suitable catalyst comprises an active γ-Al$_2$O$_3$ carrier and between 1-8 wt % CoO and between 6-10 wt % MoO$_3$. The catalyst is preferably present as an extrudate.

In step (e) sulphur compounds and carbon dioxide as present in the shifted gas mixture obtained in step (d) are removed by contacting the gas with a solvent comprising dialkylethers of polyethylene glycol. A number of such solvents are well-known to those skilled in the art. Generally, these solvents comprise one or more dialkylethers of polyethylene glycols that are normally liquid and remain so under the conditions under which contaminated product gas is processed. Typically, the solvent comprises a mixture of dimethyl- or diethylethers of polyethylene glycols, with a mixture of dimethylethers of polyethylene glycols having the following general formula being preferred:

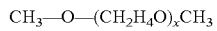

$$CH_3—O—(CH_2H_4O)_xCH_3$$

wherein x is between 3 and 9. The most preferred solvent for use in the invention comprises a mixture of such dimethylethers of polyethylene glycols available from Union Carbide Corporation, Danbury, Conn. and sold under the registered trademark "SELEXOL".

The process suitably includes a high-pressure recycle loop to reduce the loss of co-absorbed product gas. The hydrogen rich gas is contacted with the solvent in at least one absorption stage. A specified amount of the gas contaminants, such as carbon dioxide and sulphur compounds like hydrogen sulphide, are removed from the hydrogen rich gas product gas by the solvent. The decontaminated hydrogen rich gas thus obtained is discharged from the absorption stage. The solvent, which contains dissolved gas contaminants and co-absorbed hydrogen rich gas, is then partially regenerated in a high pressure recycle loop, where a portion of the dissolved contaminants and co-absorbed hydrogen rich gas is released from the solvent as a recycle gas. The recycle gas is re-compressed, cooled and then returned to the absorption stage. Regeneration of the solvent is completed by removing a residual portion of the dissolved acid gas contaminants and co-absorbed hydrogen rich gas remaining in the solvent. The co-absorbed hydrogen rich gas and gas contaminants removed from the solvent in this regeneration stage are released as a discharge gas. The fully regenerated solvent is then returned to the absorption stage.

The absorber may be a conventional absorber tower of a type well-known to those skilled in the art, and the regenerated solvent which contacts the product gas in the absorber comprises a mixture of dialkylethers of polyethylene glycols. Those skilled in the art will recognize that it is necessary to maintain thermal balance within such an absorbing process. For example, a heat exchanger may be required to adjust the temperature of the solvent prior to returning the solvent to the absorber. Typically, the solvent entering the absorber is at a temperature of from −10° C. to 50° C., and preferably from −10° C. to 5° C. Accordingly, heat exchange capacity can be added as required to insure that the solvent is at an appropriate temperature prior to being returned to the absorber and/or to otherwise maintain thermal balance within the system.

The hydrogen rich gas mixture may be used in chemical applications or in a process to make power, for example as feedstock to a gas turbine, e.g. in an IGCC-process.

The preferred water gas shift process for performing step (d) as described above shall be illustrated by the following example.

EXAMPLE

The following example shows the results a process simulation using the PRO/II® program as obtained from Invensys Systems, Inc./SimSci-Esscor, 26561 Rancho Parkway South, Lake Forest, Calif. 92630, USA.

A water scrubbed syngas mixture of carbon monoxide and hydrogen as obtained in a coal gasification process and having the composition and temperature as described in Table 1 is fed to a first WGS (water gas shift) reactor at a space velocity of 8000 h$^{-1}$.

TABLE 1

| | |
|---|---|
| Temperature | 177 |
| H$_2$ (vol. %) (*) | 22.6 |
| CO (vol %) | 68.7 |
| CO$_2$ (vol %) | 6.8 |
| N$_2$ (vol %) | 1.5 |
| H$_2$O/CO molar ratio | 0.32 |
| Sulphur (ppm) | 2150 |

(*) content on a dry basis

To the effluent of the first WGS reactor an amount of steam was added to achieve a H$_2$O/CO molar ratio as in Table 2. The resulting mixture was fed to a second WGS reactor at the temperature conditions listed in Table 2. The effluent of the second reactor is in turn provided to a third WGS reactor after adding some steam. The effluent of the third reactor is in turn provided to a fourth WGS reactor after adding some steam and the effluent of the fourth reactor is in turn provided to a fifth WGS reactor after adding some steam. The conditions and compositions of the streams are listed in Table 2.

The results in Table 2 show that more than 90% conversion of CO is achieved using a relatively low amount of added steam, corresponding to an overall Steam/CO ratio of about 1.

TABLE 2

| Reactor | Inlet temp. (° C.) | Outlet temp. (° C.) | Inlet CO content (vol. %) dry | Outlet CO content (vol. %) dry | H$_2$O/CO molar ratio at reactor inlet | Space velocity (h$^{-1}$) |
|---|---|---|---|---|---|---|
| 1 | 210 | 401 | 68.6 | 40 | 0.32 | 8000 |
| 2 | 210 | 301 | 40 | 29 | 0.25 | 8000 |
| 3 | 210 | 342 | 29 | 12 | 0.8 | 8000 |
| 4 | 210 | 263 | 12 | 6 | 0.9 | 8000 |
| 5 | 190 | 212 | 6 | 4 | 0.9 | 8000 |

What is claimed is:

1. A process to prepare a hydrogen rich gas mixture from a solid sulphur- and halogen-containing carbonaceous feedstock by (a) gasification of the solid carbonaceous feedstock with an oxygen-containing gas in an entrained flow gasifier provided with one or more burners, wherein the carbonaceous feedstock is provided to said burner(s) as a mixture of the solid carbonaceous feedstock and a gaseous carrier gas to obtain a gas mixture comprising halogen compounds, sulphur compounds, hydrogen and at least 50 vol. % carbon monoxide, on a dry basis, (b) contacting the gas mixture with a quench gas or quench liquid to reduce the temperature of the gas mixture to below 900° C., (c) contacting the gas mixture obtained in step (b) with water in a counter-current contactor having a top end and a bottom end, wherein water having a temperature of between 150 and 250° C. is continuously fed to the top of the contactor and the gas mixture to the bottom end to obtain a gas mixture comprising between 50 and 1000 ppm halogen and having a steam to carbon monoxide molar ratio of between 0.2:1 and 0.9:1, (d) subjecting the gas mixture obtained in step (c) to a water gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230° C. and wherein (e) carbon dioxide and sulphur compounds are separated from the shifted gas mixture obtained in step (d) by contacting the shifted gas mixture with a solvent comprising dialkylethers of polyethylene glycol.

2. The process according to claim 1, wherein the carbon monoxide, on a dry basis, in the gas mixture obtained in step (a) is between 50 and 75 vol. %.

3. The process according to claim 1, wherein the gas mixture as obtained in step (a) is reduced in temperature by means of an indirect heat exchanger to a temperature of between 150 and 400° C.

4. The process according to claim 1, wherein the space velocity in the fixed bed reactor or in any one fixed bed reactor of a series of reactors of step (d) is between 6000-9000 h$^{-1}$.

5. The process according to claim 1, wherein the water gas shift reaction is performed in a series of 4 or 5 reactors.

6. The process according to claim 1, wherein each reactor is operated such that the maximum temperature in the fixed bed does not exceed 440° C.

7. The process according to claim 6, wherein the maximum temperature in the fixed bed does not exceed 400° C.

8. The process according to claim 1, wherein no water or steam is added to the gas mixture obtained in step (c) before subjecting said gas mixture to the water gas shift reaction.

9. The process according to claim 1, wherein the carbon monoxide, on a dry basis, in the gas mixture obtained in step (d) is below 5 vol. %.

10. The process according to claim 9, wherein the carbon monoxide, on a dry basis, in the gas mixture obtained in step (d) is below 1 vol. %.

11. The process according to claim 1, wherein the solvent of step (e) comprises a mixture of dimethyl- or diethylethers of polyethylene glycols.

12. The process according to claim 11, wherein the solvent is a mixture of dimethylethers of polyethylene glycols having the following general formula:

$$CH_3-O-(CH_2H_4O)_xCH_3$$

wherein x is between 3 and 9.

* * * * *